United States Patent
Seifert

(10) Patent No.: US 8,757,538 B2
(45) Date of Patent: Jun. 24, 2014

(54) AIRCRAFT HAVING A VARIABLE GEOMETRY

(75) Inventor: Jost Seifert, Manching (DE)

(73) Assignee: EADS Deutschland GmbH, Ottobrunn (DE)

( * ) Notice: Subject to any disclaimer, the term of this patent is extended or adjusted under 35 U.S.C. 154(b) by 51 days.

(21) Appl. No.: 13/269,946

(22) Filed: Oct. 10, 2011

(65) Prior Publication Data

US 2012/0085858 A1 Apr. 12, 2012

(30) Foreign Application Priority Data

Oct. 11, 2010 (DE) .......................... 10 2010 048 139

(51) Int. Cl.
*B64C 3/38* (2006.01)

(52) U.S. Cl.
USPC ................ 244/46; 244/45 R; 244/47; 244/49; 244/87

(58) Field of Classification Search
USPC ....... 244/45 R, 46, 47, 49, 87; D12/319, 331, D12/333, 334, 335, 338
See application file for complete search history.

(56) References Cited

U.S. PATENT DOCUMENTS

| | | | | |
|---|---|---|---|---|
| 2,166,564 A | * | 7/1939 | Pavlecka et al. | 244/49 |
| 2,925,233 A | * | 2/1960 | Dunn et al. | 244/218 |
| 3,139,248 A | * | 6/1964 | Alvarez-Calderon | 244/207 |
| 3,218,005 A | * | 11/1965 | Alvarez Calderon | 244/218 |
| 3,292,881 A | * | 12/1966 | Ricard | 244/46 |
| 3,426,983 A | * | 2/1969 | Deplante | 244/46 |
| 3,463,419 A | * | 8/1969 | Rashidian | 244/46 |
| 3,490,720 A | * | 1/1970 | Girard | 244/7 R |
| 4,455,004 A | * | 6/1984 | Whitaker, Sr. | 244/90 R |
| 4,698,041 A | * | 10/1987 | Dasa | 446/61 |
| 4,702,441 A | * | 10/1987 | Wang | 244/204 |
| 5,007,875 A | * | 4/1991 | Dasa | 446/66 |
| 5,118,052 A | * | 6/1992 | Alvarez Calderon | 244/49 |
| 5,645,250 A | * | 7/1997 | Gevers | 244/101 |
| 5,988,563 A | * | 11/1999 | Allen | 244/49 |
| 6,227,487 B1 | * | 5/2001 | Clark | 244/99.12 |
| 6,392,213 B1 | * | 5/2002 | Martorana et al. | 244/3.1 |
| 7,275,722 B2 | * | 10/2007 | Irving et al. | 244/201 |
| 7,841,559 B1 | * | 11/2010 | O'Shea | 244/46 |
| 8,146,855 B2 | * | 4/2012 | Ismailov | 244/49 |
| 2004/0262451 A1 | * | 12/2004 | McLean | 244/45 R |
| 2010/0051741 A1 | * | 3/2010 | Ismailov | 244/13 |

FOREIGN PATENT DOCUMENTS

DE 3710703 A1 * 10/1988 ............ B64C 39/08

OTHER PUBLICATIONS

Non Planar Wing Concepts for Increased Aircraft Efficiency. I. Kroo, Jun. 6, 2005 Stanford university, p. 15.*

* cited by examiner

*Primary Examiner* — Isam Alsomiri
*Assistant Examiner* — Assres H Woldemaryam
(74) *Attorney, Agent, or Firm* — Crowell & Moring LLP

(57) ABSTRACT

An aircraft having a variable geometry for adapting the flight characteristics to different flight situations includes a fuselage with a pair of wings projecting on both sides of the fuselage in the transverse direction (y), each of which wings has an inner wing section arranged stationarily with respect to the fuselage and an outer wing section adjacent thereto and pivotable about a pivot axis. The pivot axis is oriented in a direction deviating from the longitudinal direction (x) of the aircraft by a maximum of 40°.

14 Claims, 4 Drawing Sheets

AIRCRAFT HAVING A VARIABLE GEOMETRY

CROSS-REFERENCE TO RELATED APPLICATIONS

Figure 1:
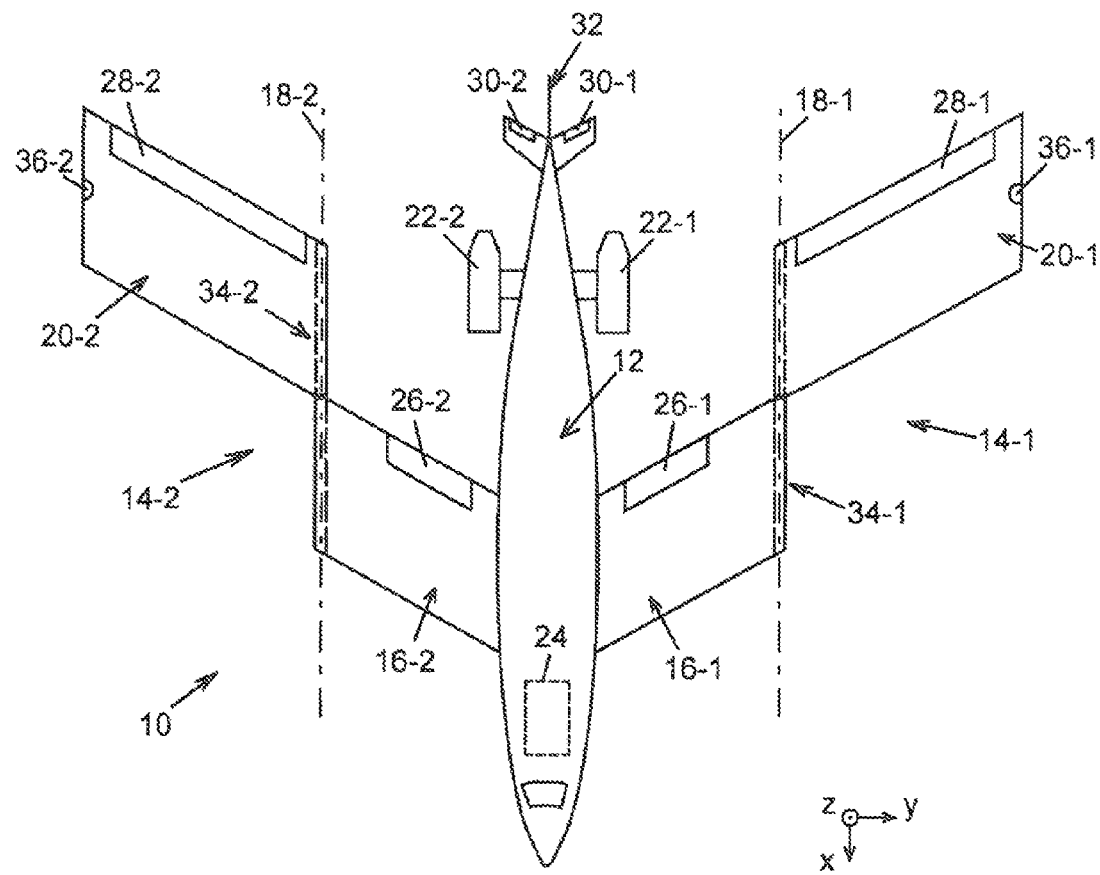

The present application claims priority under 35 U.S.C. §119 to German Patent Application No. 10 2010 048 139.4, filed Oct. 11, 2010, the entire disclosure of which is expressly incorporated by reference.

BACKGROUND AND SUMMARY OF THE INVENTION

The present invention relates to an aircraft having a variable geometry for adapting the flight characteristics and, further, to the use of such an aircraft or a method for changing the geometry of the aircraft during the flight.

Airplanes with variable geometry are sometimes referred to as "swing-wing aircrafts" (e.g. "Grunmann F-14 Tomcat", "Mikojan-Gurewitsch MiG-23 and MiG-27" etc.). These known aircrafts comprise a fuselage with a pair of wings projecting therefrom in the transverse direction. Each of the wings has an inner wing section arranged stationarily with respect to the fuselage and an outer wing section adjacent thereto and pivotable about a pivot axis. The pivot axis is substantially oriented in the vertical direction of the aircraft.

By means of the pivotability of the outer wing sections of such a swing-wing aircraft, the sweep of the wings, and thus the geometry ("configuration"), can be varied during the flight so as to advantageously adapt the flight characteristics (e.g., air resistance, uplift, maneuverability etc.), to take account of the respective requirements in different flight situations (e.g. take-off and landing, cruise flight, military combat missions etc.). It is known that a rather small sweep is advantageous, for example, for an energy-efficient flight over large distances (cruise flight), whereas a larger sweep is particularly advantageous for reducing the air resistance during a particularly fast flight.

However, the known aircrafts with variable geometry also have disadvantages. Besides the need to install a pivoting drive for pivoting the wings, which increases the weight, there is, for example in the military sector, an increasing demand with respect to a "low radar signature shape" in order to avoid radar detection or ranging of the aircraft or at least to make it difficult. Additionally, this field of application typically requires an energy-efficient cruise flight, as well as maneuverable and agile flight characteristics, as in case of a combat aircraft, within one flight mission. The design objectives for an aircraft which meets these requirements are complementary. A particularly energy-efficient cruise flight is only possible with wings having a high aspect ratio (slim wings). However, such wings reduce the agility due to the relative high moment of inertia about the longitudinal axis of the aircraft. Moreover, slim wings make it difficult to design suitable pivoting kinematics for a predefined wing area.

Exemplary embodiments of the present invention provide an alternative approach for an aircraft with variable geometry by providing a simplified "pivoting drive", which makes the aforementioned conflict of objectives more manageable in order to broaden in this manner the field of use of the aircraft.

In accordance with exemplary embodiments of the present invention, the pivot axis of the wings of an aircraft is oriented in a direction which deviates by a maximum of 40°, preferably by a maximum of 20°, from the longitudinal direction (corresponding to the flight direction) of the aircraft.

For example, the pivot axis can be oriented substantially in the longitudinal direction. This refers, in particular, to orientations deviating by a maximum of 20°, preferably by a maximum of 10° from the longitudinal direction of the aircraft.

If the pivot axis is not exactly oriented in the longitudinal direction, then in accordance with exemplary embodiments of the present invention, an inclination angle of the pivot axis with respect to the horizontal plane is smaller than an inclination angle of the vertical plane which is spanned by the longitudinal direction and the vertical direction.

Due to the pivotability of the wing sections about the pivot axes, which are oriented to a greater or lesser extent in the longitudinal direction, it is advantageously possible to fulfill flight missions with one and the same aircraft for which missions otherwise at least two different airplane configurations would be required. This would require the energy-efficient configuration with non-pivoted outer wing sections and thus "stretched" wings and at least one more agile configuration with pivoted outer wing sections and thus "effectively shortened" wings.

Further particular advantages of the invention are that the aircraft can be configured with a low radar signature (in particular also in the pivoted state of the wings) and that the pivoting mechanism does not need a separate pivoting drive specifically provided for pivoting. In fact, pivoting can be carried out by utilizing aerodynamic forces which act on the outer wing sections during the flight.

The terms "inner" (wing sections) and "outer" (wing sections) relate to the arrangement in the non-pivoted state in which, viewed in the transverse direction, the outer wing sections are farther out than the inner wing sections. To simplify matters, these designations for the two different wing sections are also used for the pivoted state although these designations are not quite correct because in a pivoted state, viewed in the transverse direction, the "outer wing section" can be arranged in approximately the same position as the "inner wing section".

The term "fuselage" in the meaning of the invention is to be understood in a broader sense as the central region of the aircraft viewed in the transverse direction. In one embodiment, the aircraft comprises a "conventional fuselage" in the meaning that the latter can be clearly distinguished or differentiated from the wings projecting therefrom on both sides (a typical example for this is an approximately "cigar-shaped" elongated fuselage). In another embodiment, which is known among experts as "flying wing configuration", the aircraft comprises no defined fuselage or fuselage that can be clearly differentiated from wings projecting on both sides. In this case there is a fluent transition between fuselage and wings or, in the extreme case, the fuselage is formed, when viewed in the transverse direction, by the inner ends of the inner wing sections themselves. In case of the latter "flying wing type", the central portion of the aircraft, when viewed in the transverse direction, can be considered as the fuselage.

The present invention is particularly suitable for military applications, be it as an unmanned aircraft or as a manned aircraft.

In one preferred embodiment, the aircraft comprises a control device for actuating automatic pivoting of the outer wing sections during the flight due to an actuation command and/or in dependence on at least one airplane status parameter.

Such a control system can be part of a so-called avionics (flight control system) or can be connected thereto for implementing automatic pivoting in order to adjust, for example, control elements provided on the outer wing sections such as rudders ("ailerons") or other adjustable, aerodynamically effective wing parts (e.g. flaps on the upper or lower wing side).

In case of a manned aircraft, adequate actuation commands for initiating automatic pivoting can be provided by corresponding operating commands of a pilot. In case of an unmanned aircraft, actuation commands can be transferred to the aircraft via a remote control system, which is available anyway for controlling the aircraft. In both cases, actuation commands can also be generated alternatively or additionally in an automatic manner (e.g. by an "autopilot" or another automatically operating flight control), for example to adapt, in case of a predetermined flight route, the properties of the aircraft to the local requirements (for each of the actual route sections).

Flight condition parameters which, for example, can be used as sensorially detected measurands alternatively or additionally to actuation commands for initiating and/or carrying out a pivoting process, can comprise, for example, the current airspeed (preferably the "true airspeed"), the current aerodynamic load situation, accelerations in different directions, angular acceleration about different axes etc.

According to one embodiment, the aircraft comprises a stabilizing mechanism in the region of the pivot axes for locking the outer wing section in the non-pivoted state against undesired pivoting, for example, by aerodynamic forces or also by inertial forces. In case of outer wing sections that can be pivoted upwardly, ascending forces have to be considered which, without such a locking mechanism, could cause undesired upward pivoting of the outer wing sections.

According to one aspect of the present invention, the stabilizing mechanism can be actuated using a control device in such a manner that by inactivating or at least reducing the locking effect, pivoting can be initiated by aerodynamic forces acting on the outer wing section. Alternatively or additionally to utilizing aerodynamic forces as "pivoting drive", it is also possible to provide an additional drive, for example, an electric drive that can be located in the region of a mounting device defining the respective pivot axis.

For example, if it is intended, starting from the non-pivoted state of the wing, to pivot the outer wing sections upwardly, the uplift already present at the outer wings sections can advantageously be utilized for initiating this pivot movement. For this it is only necessary to suitably reduce or completely eliminate the locking effect. In particular, in the latter case it is advantageous if the outer wing sections are provided with adjustable control elements (in the simplest case, e.g., ailerons), which can be suitably actuated for a pivoting process which is partially or completely carried out by aerodynamic forces. This can be carried out, for example, by the mentioned control device, if necessary in connection with an avionics system.

The pivot movement is preferably provided with a pivoting angle of at least 110°, preferably at least 120°. When starting from a non-pivoted state of the outer wing sections, more than one additional pivoting state can be taken, thus at least one "intermediate position" can be actuated in steps or continuously variable, the aforementioned pivoting angles are to be understood as the angle difference between non-pivoted state ("stretched wings") and "maximally pivoted state" (end position).

The term "stretched wing" designates, for example, an arrangement of the outer wing sections with respect to the inner wing sections, wherein the planes spanned by these two wing sections are substantially congruent or intersect at most at a small angle.

According to an advantageous embodiment, the edges of the free ends of the outer wing sections extend parallel to each other in the maximally pivoted state, in particular both substantially in the longitudinal direction of the aircraft (so that they can contact each other without gap).

In one embodiment, the aircraft comprises a stabilizing mechanism (if applicable, further stabilizing mechanisms) for locking the free ends of the outer wings in a pivoted state, in particular the "maximally pivoted" state. There are different possibilities for such a locking mechanism:

In one embodiment, the aircraft comprises, for example, a stabilizing mechanism arranged on the fuselage for locking the free ends of the outer wings sections to the fuselage and/or to each other.

According to another embodiment, such a stabilizing mechanism is arranged at a vertical tail (in particular at the free end of the same) projecting from the fuselage in the vertical direction.

According to another embodiment, such a stabilizing mechanism is arranged at a horizontal tail projecting from the fuselage on both sides in the transverse direction.

Yet another embodiment of such a stabilizing mechanism provides, for example, that the latter is arranged at the free ends of the outer wing sections themselves so as to fix the free ends of the pivoted wing sections to each other (if applicable, without connection to the fuselage or spaced apart from the fuselage of the aircraft). For implementing this embodiment, coupling elements which can be brought into engagement with each other can be provided at the free ends of the outer wing sections.

As already mentioned, according to one embodiment, the aircraft does not have a defined fuselage. In this embodiment, the payload can be accommodated in the wing sections. The aircraft propulsion can be integrated at the wings, for example, in the region of the pivot axes. At an inner rigid wing ("inner wing sections"), at the lateral ends of the same, the pivotable "outer wing sections" are mounted, wherein their lateral outer ends can preferably be connected and locked to each in the pivoted state.

In a preferred embodiment the pivot axes are arranged in such a manner that the wingspan of the aircraft can be substantially halved by pivoting. In this respect the wingspan can be reduced by a pivoting process by at least 40%, in particular at least 50%.

In one embodiment the wing has a positive leading-edge sweep and/or a positive trailing-edge sweep in the non-pivoted state.

If, in the non-pivoted state, the outer wing sections as such have a positive sweep at the leading edge and/or the trailing edge, it is possible through a suitable selection of the orientation of the pivot axes to achieve a negative sweep at the leading edge or the trailing edge in the pivoted state (if the outer wing sections were pivoted far enough), which is advantageous for many applications or flight situations.

It should be noted in this connection that the sweep angles of the outer wings in the non-pivoted state and in the pivoted state can be selected largely independent of each other. Based on a certain sweep in the non-pivoted state, the sweep in the pivoted state is primarily determined by the orientation of the pivot axes which can be selected accordingly.

In one embodiment a course of the leading edge of the outer wing sections is offset backward with respect to a course of the leading edge of the inner wing sections and/or a course of the trailing edge of the outer wing sections is offset backward with respect to a course of the trailing edge of the inner wing sections. Such an offset of the wings often offers aerodynamic advantages, in particular in the non-pivoted state, by reducing the air resistance.

In one embodiment, the outer wing section has a substantially symmetrical wing profile. It has to be considered here that in case of a sufficiently large pivoting movement of the outer wing section, the upper side and the lower side of the latter are "interchanged". In this respect, an asymmetric profile which, for example, provides an uplift in the non-pivoted state, would often be disadvantageous due to a descending force in the pivoted state. From this point of view, as already mentioned, providing the outer wing sections with controllably adjustable, aerodynamically effective control elements (e.g. rudders etc.) is very advantageous so as to be able to set the aerodynamic effect of the outer wing section depending on the actual pivoting state by a suitable adjustment of such elements. Preferably, the wing sections are each provided with one rudder ("aileron") extending substantially over the entire length (wingspan) of the respective wing section (e.g. over at least 90% of said length) so that it can assume the function of a so-called plain flap.

According to a first aspect of a method for changing the geometry of an aircraft according to the invention, this change takes place during the flight by utilizing aerodynamic forces which act on the outer wing sections.

These forces depend, for example, on the current flight condition so that by suitably controlling the aircraft, such an "aerodynamic pivoting drive" is possible for both pivoting directions. In one aspect of the present invention, the outer wing sections themselves are provided with adjustable, aerodynamically effective control elements, preferably rudders, at the trailing edges of the wing, so that more or less depending on the current flight condition, a suitable pivoting movement of these control elements can be carried out.

Control flaps and/or rudders arranged on the outer wing sections can be configured in such a manner that by adjusting the same, a pivoting movement of the outer wing sections in the two pivoting directions can be effected. For rudders at the trailing edges of the outer wing sections this can mean that they can be pivoted upwardly as well as downwardly out of a central plane of the outer wing sections.

According to one development of this method for changing the geometry of the aircraft, the aircraft is equipped with a stabilizing mechanism arranged in the region of the pivot axes and this stabilizing mechanism counteracts the pivoting movement with a certain resistance. Such a "pivoting brake" can advantageously prevent pivoting being carried out too fast. Moreover, by such a "damped pivoting", the control effort for actuating control elements on the outer wing section during pivoting can be advantageously simplified. According to one aspect, when carrying out the pivoting movement, an auxiliary pivoting mechanism is used by means of which, if necessary, a torque decelerating the pivoting movement and/or a torque supporting the rotational movement can be exerted on the respective outer wing section. The need for a decelerating torque or a supporting torque can arise already in the design phase for predetermined portions of the pivoting process. Alternatively or additionally, such a need can also be determined by a control unit through a control algorithm based on a sensorial detection of parameters of the pivoting movement (e.g., current pivoting angle, current angular velocity of the pivoting movement etc.), whereupon said control unit actuates the auxiliary pivoting mechanism accordingly.

According to a further development of the above-illustrated method for changing the aircraft geometry, the pivoting movement is controlled in such a manner that, based on a sensorially detected pivoting angle position and a desired pivoting movement (e.g., chronological pivoting course), an adjustment of aerodynamically effective control elements of the aircraft, for example, of control flaps or rudders on the outer wing sections, takes place. According to one aspect, such a controlled or regulated adjustment of control elements during pivoting can also be combined with the actuation of the aforementioned auxiliary pivoting mechanism.

According to a second aspect of the method for changing the geometry of the aircraft, which can also be combined with the first aspect, it is provided that the change of the geometry (by pivoting the outer wing sections) during the flight takes place in a flight condition with significantly reduced aerodynamic forces, in particular, for example, at the outer wing sections. This reduces the risk that by initiating the pivoting movement, although the resulting changes of the aerodynamic conditions with respect to flight stability are too drastic. In case of an aerodynamic pivoting drive, this measure prevents the pivoting movement from being performed too fast. In case that, alternatively or additionally, a separate drive (e.g., electromotive drive) or the mentioned auxiliary pivoting mechanism is employed for initiating the pivoting movement, this results advantageously in low requirements with respect to the performance of such a drive or such a mechanism.

The term "significantly reduced aerodynamic forces" covers in particular such forces that effect a torque acting on the outer wing section with respect to the pivot axes and which is not more than 50%, preferably not more than 25% of the torque which results from a normal straight and level flight (cruise flight).

In this respect, for example, carrying out the pivoting movement can be provided during a so-called parabolic flight. The aerodynamic forces acting during a parabolic flight are largely reduced so that this specific flight condition can be advantageously used within the context of the invention for changing the configuration of the aircraft.

BRIEF DESCRIPTION OF THE DRAWING FIGURES

Figure 2:
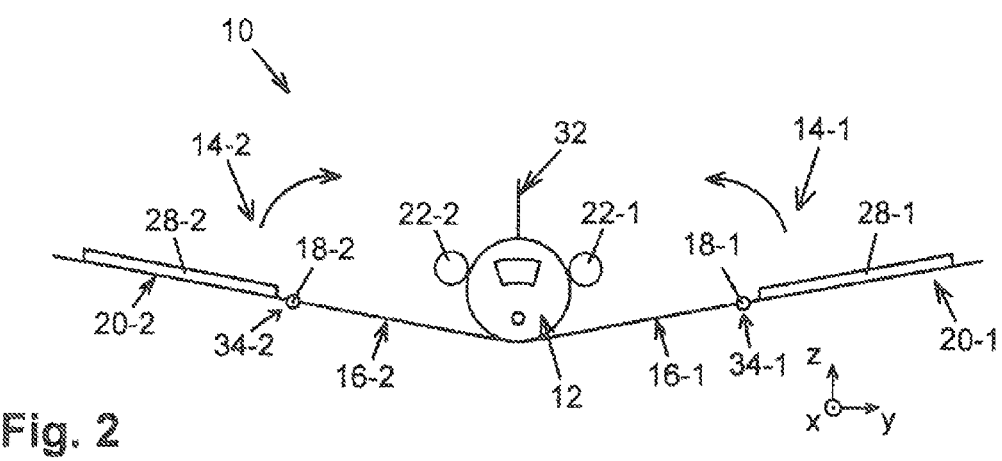
Figure 3:
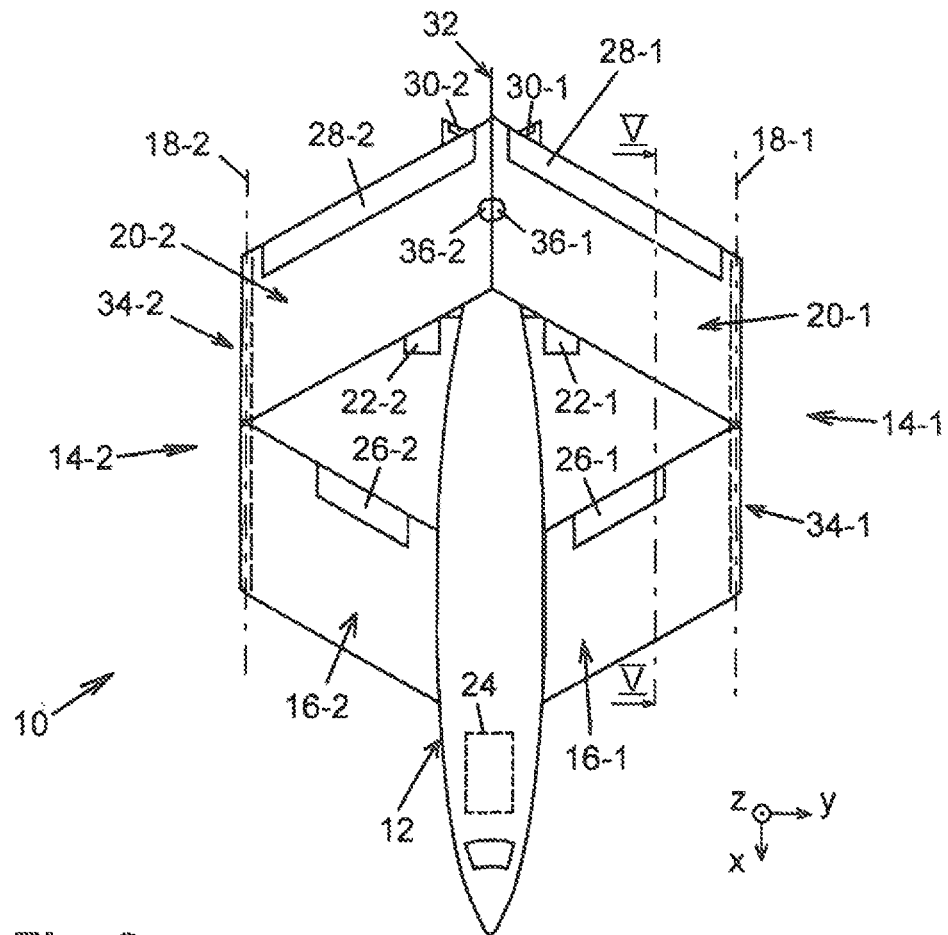
Figure 4:
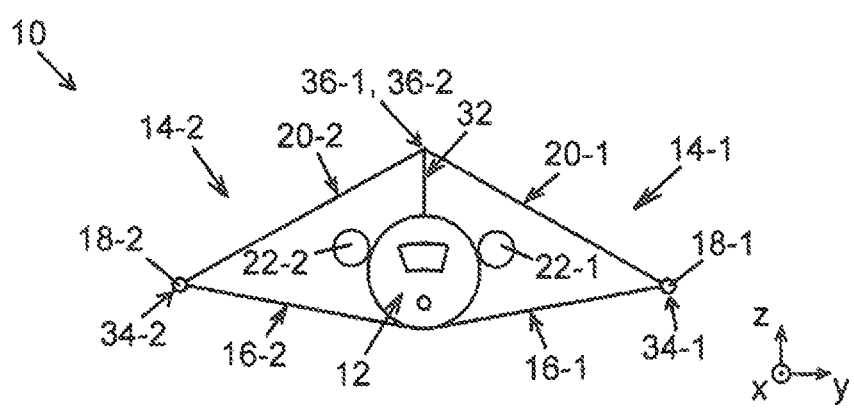
Figure 5:
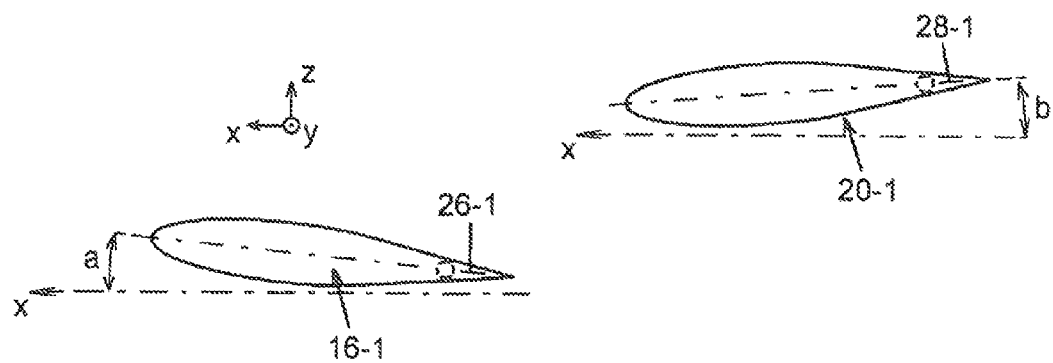
Figure 6:
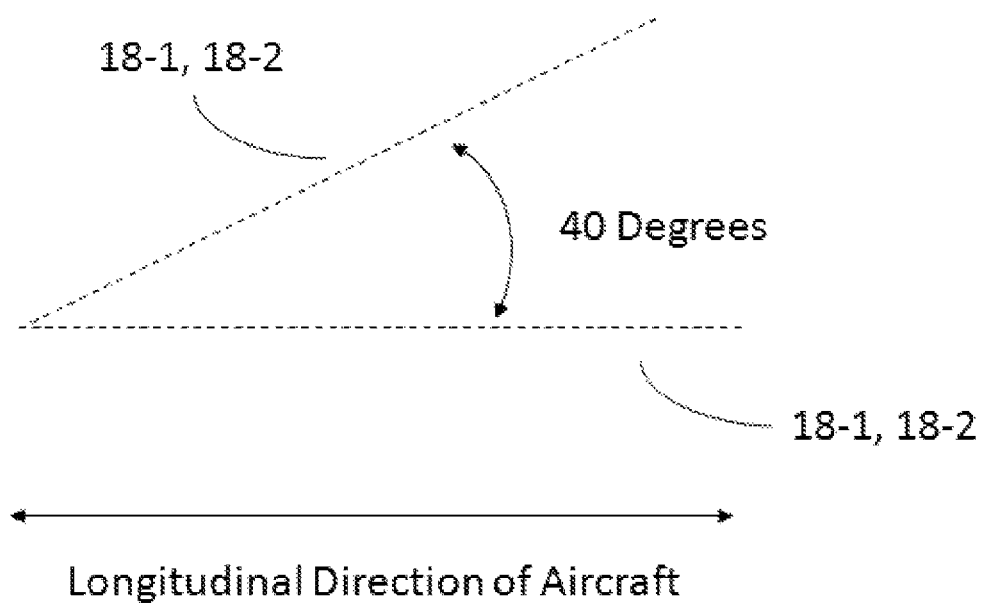

The invention is further described below by means of an exemplary embodiment with reference to the accompanying drawings. In the figures:

FIG. 1 shows a schematic top view of an aircraft according to the invention according to an exemplary embodiment, illustrated in a "first configuration" with stretched wings, FIG. 2 shows a front view of the aircraft of FIG. 1, FIG. 3 shows a top view of the aircraft, but illustrated in "second configuration" with pivoted outer wing sections, FIG. 4 is front view of the aircraft of FIG. 3, FIG. 5 is a sectional view of a wing along the line V-V in FIG. 3, and FIG. 6 illustrates a pivot axis oriented in a direction deviating from a longitudinal direction of the aircraft by a maximum of 40°.

DETAILED DESCRIPTION

FIGS. 1 and 2 show an aircraft 10, comprising a fuselage 12 with a pair of wings 14-1 and 14-2 projecting therefrom on both sides in the transverse direction y, each of which wings has an "inner wing section" 16-1 or 16-2, respectively, arranged stationarily with respect to the fuselage 12 and an "outer wing section" 20-1 or 20-2, respectively, arranged adjacent thereto which, with respect to the inner wing section 16-1 or 16-2, respectively, can be pivoted about the pivot axis

18-1 or 18-2, respectively, which is oriented in the longitudinal direction (flight direction) x.

The reference numbers of components which are provided twice (to the left and right of the center of the fuselage) in the exemplary embodiment but are analog with respect to their effect such as, e.g., the wings 14-1 and 14-2, are numbered consecutively (in each case complemented by a hyphen and the number "1" or "2"). Reference to individual components of such components or the entirety of such components is made below by the non-complemented reference number.

In the illustrated exemplary embodiment, the fuselage 12 of the aircraft 10 is elongated in the longitudinal direction x and is approximately "cigar-shaped". For propulsion in the illustrated example, jet engines 22 are provided in the tail region of the fuselage 12.

Controlling the aircraft 10 takes place by means of an avionics system 24 via aerodynamically effective control elements that are adjustable through actuation. In the illustrated example, the control elements comprise inner ailerons 26 (at the inner wing sections 16), outer ailerons 28 (at the outer wing sections 20), elevators 30 (at a horizontal tail) and a rudder (not shown in the figures, at a vertical tail 32).

A peculiarity of the illustrated example is an offset of the outer wing sections 20-1 and 20-2 with respect to the inner wing sections 16-1 and 16-2, respectively, to the rear, viewed in the longitudinal direction x. This offset offers aerodynamic advantages and, deviating from the illustrated example, makes it possible to dispense with the horizontal tail including the elevators 30.

By means of the pivotability of the outer wing sections 20 about the pivot axes 18, the geometry or "configuration" of the aircraft 10 can be varied in a manner as described in more detail below. With this variation, an adaptation of the flight characteristics to different flight situations can be advantageously achieved during the flight.

Based on the "first configuration" of the aircraft 10 illustrated in the FIGS. 1 and 2, only one further configuration is provided which is designated below as "second configuration" and is illustrated in the FIGS. 3 and 4.

While the first configuration (FIGS. 1 and 2) with the wings "stretched" in the transverse direction y is provided, in particular, for take-off and landing and an energy-efficient cruise flight, the second configuration (FIGS. 3 and 4), in which the outer wing sections 20 are pivoted upward out of their initial position by approximately 140° (cf. arrows in FIG. 2), offers more maneuverable and more agile flight characteristics of the aircraft 10.

In the illustrated example, the pivot axes 18 are located approximately in the region of the respective wingspan center (viewed in the transverse direction y) of the two wings 14 so that the pivoting end position according to the second configuration (FIGS. 3 and 4) results advantageously in directly adjacent free ends of the wing sections 20 or free ends contacting each other. Thus, in the second configuration, these free ends can be fixed to each other by coupling means 36-1 and 36-2 which can be brought in engagement with each other so that a very strong assemblage is created which, viewed from the front, has an approximately rhombic shape (cf. FIG. 4). High uplift forces or descending forces are easier absorbed by this assemblage. Moreover, the second configuration results advantageously in comparatively "short wings" (viewed in the direction y) which, in the illustrated example, are connected in the front and the back to the fuselage 12 so that also the top view shows an approximately rhombic assemblage. The bending moments in the second configuration resulting from flight maneuvers under high load are advantageously relatively low because the lever arms are virtually halved (compared to the first configuration).

The avionics system 24 controls the adjustments of the control elements for the normal control of the aircraft 10 and, in addition, also the pivoting processes provided according to the invention for changing the configuration of the aircraft 10 during the flight. According to a preferred embodiment, the configuration change takes place in a flight condition with significantly reduced aerodynamic forces at the outer wing sections 20, for example during a so-called parabolic flight. Thus, the aerodynamic loads acting during pivoting on the wings 14 can advantageously be kept low.

Deviating from the illustrated example, the pivot axes 18 can be oriented slightly deviating from the longitudinal direction x, for example with a deviation from the longitudinal direction x of less than 30°. As illustrated in FIG. 6, the pivot axis 18-1, 18-2 can be oriented in a direction deviating from a longitudinal direction of the aircraft by a maximum of 40°. In case the pivoting axes 18 are not exactly oriented in the longitudinal direction x, it is provided according to a preferred embodiment variant that an inclination angle 18 with respect to the horizontal plane (x-y plane) is smaller than an inclination angle with respect to that vertical plane (x-z plane), which is spanned by the longitudinal direction x and the vertical direction z.

The transition between the two configurations is implemented by means of the avionics system 24 by automatically pivoting the outer wing sections, wherein initiating a corresponding pivoting process can take place due to an actuation command and/or depending on at least one sensorially detected flight condition parameter, such as flight velocity. According to one development, after initiating a pivoting process, the avionics system 24 puts the aircraft 10 in a flight condition with significantly reduced aerodynamic forces, for example a so-called parabolic flight, so as to allow a pivoting process that can be controlled as good as possible.

Advantageously, pivoting is carried out by utilizing aerodynamic forces acting, during the flight, on the outer wing sections 20 or the ailerons 28 thereof. In the illustrated example, a separate drive (e.g. electric drive) specifically provided for pivoting is therefore omitted.

Based on the first configuration (FIGS. 1 and 2), an aerodynamically driven pivoting of the outer wing sections 20 (here: upward by approximately 140°) into the second configuration (FIGS. 3 and 4) can take place after releasing a locking effect of a mounting unit 34 provided in the region of the pivot axes 18.

During a pivoting process, the mounting units 34 can provide a certain braking force (or a braking torque) so as to prevent a pivoting movement that is too fast. Such a braking effect can be provided, for example, based on a viscous oil friction in a hydraulic braking unit. If necessary, the respective braking unit can be actuated depending on sensorially detected flight condition parameters and/or can provide a braking effect which depends on the current pivoting angle.

During a flight in the first configuration (FIGS. 1 and 2), the same mounting units 34, on the other hand, can function as stabilizing mechanism for securely locking the outer wing sections 20 in the non-pivoted state (first configuration) against undesired pivoting.

Depending on the actual flight condition, a suitably controlled rudder deflection of the outer ailerons 28 can be required or can be advantageously used for achieving a "well defined" pivoting process with a desired speed. For this, for example, a suitable actuation of the outer ailerons 28 and/or other control elements by means of the avionics system 24 can take place based on sensorially detected flight condition parameters (in particular comprising the current pivoting angle).

Likewise, proceeding from the second configuration (FIGS. 3 and 4), a configuration change back again into the first configuration (FIGS. 1 and 2) can be initiated or carried out by suitably actuating the control elements by the avionics system 24.

Thus, in the illustrated example, both pivoting mechanisms advantageously do not require an additional drive (e.g., electric drive in the region of the mounting units 34) for bringing the wings 14 into the configuration desired in each case.

In the second configuration (FIGS. 3 and 4) too, an advantageous stabilization of the wing configuration occurs by a further stabilizing mechanism which, in the illustrated example, includes the already mentioned coupling means 36-1 and 36-2, which can be brought in engagement with each other and which are arranged at the free ends of the outer wing sections 20-1 and 20-2, respectively, and serve for locking the free ends of the outer wing sections in the maximally pivoted state (second configuration).

By the couplings means 36, which are likewise actuated by means of the avionics system 24, the free ends of the outer wing sections 20 in the illustrated example are locked to each other in a second configuration. Alternatively or additionally, suitably modified coupling means and an arrangement of further coupling means could provide, e.g., for interlocking these ends also on the fuselage 12 or on a part of the aircraft 10 which is stationarily arranged on the fuselage 12. Parts of the fuselage 12 which are suited for this are, for example, the vertical tail 32 and the horizontal tail.

Alternatively or additionally it is also possible to arrange for a locking effect for stabilizing the second configuration, which locking effect is provided by the mounting units 34 (in the region of the pivot axes 18). If, for example, the mounting units 34 form an already mentioned pivoting brake or auxiliary pivoting mechanism anyway, the locking effect could be provided in a constructionally advantageous manner with a "blocking braking effect" as an extreme setting of these mounting units 34.

According to a preferred embodiment, which is also provided in the illustrated example, the edges of the free ends of the outer wing sections run parallel to each other in the maximally pivoted state (here: second configuration), in particular both in the longitudinal direction x, so that they can contact each other without gap and/or the mentioned coupling means can be used in a simple manner for stabilizing the second configuration.

Deviating from the illustrated exemplary embodiment it is also possible to provide, besides the first and the second configurations, at least one "intermediate position" with a pivoting angle of less than 140° with respect to the first configuration in which intermediate position, the mounting unit 34 could provide a suitable interlock of the outer wing sections 20 against pivoting.

In the illustrated example, the inner wing sections 16 and the outer wing sections 20 each have a positive leading edge sweep and a positive trailing edge sweep in the first configuration (FIGS. 1 and 2). However, after pivoting into the second configuration (FIGS. 3 and 4), the outer wing sections 20 have a negative leading edge and a negative trailing edge.

Through this "sweep combination" in the second configuration, leading positive sweep and trailing negative sweep, good flight stability and controllability are achieved. An advantageous longitudinal distance between the center of mass and the aerodynamic point of action is obtained. Moreover, through the mentioned sweeps of the wing sections 16 and 20, an advantageously reduced radar signature from the front and from behind is achieved. Finally, a low characteristic impedance in the transonic and supersonic speed range is obtained.

However, deviating from the illustrated example, a positive sweep of the wing sections 20 could also be provided in the second configuration. In order to modify the illustrated example in this manner, e.g., an orientation of the pivot axes 18 could be selected which likewise extends in the horizontal plane (x-y plane), but deviates from the vertical plane (x-z plane) at an angle which is larger than the "sweep angle" of the wing section 20 in the first configuration (here: approximately 30°).

Moreover, deviating from the illustrated example, an arrangement is conceivable in which the outer wing sections 20 have a leading edge sweep and/or trailing edge sweep of approximately 0° (e.g. smaller than 10°) in the non-pivoted state.

FIG. 5 is a sectional view along the line V-V in FIG. 3 and illustrates the relative arrangement and orientation of the profiles of the wing sections 16-1 and 20-1 in the second configuration.

As illustrated, the inner wing section 16-1 has (for both configurations) an identical positive angle of attack a with respect to the incident flow in the longitudinal direction x. In the second configuration illustrated in FIG. 5, the outer wing section 20 (in consideration of the pivoting movement about the longitudinal pivot axes 18 oriented here in the longitudinal direction x) has a negative angle of attack with the absolute value b.

With respect to advantageous flight properties and flight stability in both configurations, the absolute value of the (positive) angle of attack a is preferably greater than the absolute value of the angle of attack b.

In order to compensate or avoid, during the transition between the two configurations of the outer wings, a corresponding reversion of the aerodynamic uplift effect through a change of sign of the angle of attack b, the outer ailerons 28, which extend in the illustrated example substantially over the entire length (in transverse direction), are very useful. In this case, these ailerons 28 can virtually function as "plain flaps" so as to be able to selectively set a desired uplift effect or descending effect in the respective configuration or pivoting state.

Moreover, it is preferred in this regard, as illustrated, that at least the outer wing section 20 has a substantially symmetric profile with respect to its chord.

By providing the inner wing sections 16 as well as the outer wing sections 20 with control surfaces in the form of the ailerons 26 and 28 which, when viewed in the longitudinal direction x, are located in the second configuration in the "front and the back", very direct and efficient changes of the total uplift can be achieved in an advantageous manner. In this case, the ailerons and the elevators can be advantageously used for controlling the aircraft and can be deflected symmetrically. To achieve this, conventional aircrafts would first have to rotate about the transverse axis (direction y) so as to change the angles of attack and thus the uplift at the wings 14. The result is a time-delayed effect.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An aircraft having a variable geometry for adapting the flight characteristics, comprising:
   a fuselage;
   a pair of wings projecting on both sides from the fuselage in transverse direction, wherein each of wings of the pair of wings has an inner wing section arranged stationarily with respect to the fuselage and an outer wing section adjacent to the inner wing section, the outer wing section is configured to be pivotable about a pivot axis, wherein the pivot axis is oriented in a direction deviating from a longitudinal direction of the aircraft by a maximum of 40°, and is substantially oriented in said longitudinal direction, wherein when the outer wing sections are in an unpivoted state; and
   a course of a leading edge of the outer wing sections is offset backward with respect to a course of a leading edge of the inner wing sections and a course of the trailing edge of the outer wing sections is offset backward with respect to a course of the trailing edge of the inner wing sections in such a manner that the leading edges of the outer and inner wings are offset at the pivot axis and the trailing edges of the outer and inner wings are offset at the pivot axis, wherein the outer wing sections are completely aft the inner wing sections.

2. The aircraft of claim 1, wherein the pivot axis is oriented in a direction deviating from a longitudinal direction of the aircraft by a maximum of 20°.

3. The aircraft according to claim 1, further comprising:
   a control device configured to actuate automatic pivoting of the outer wing sections during flight due to an actuation command or in dependence on at least one flight condition parameter.

4. The aircraft according to claim 1, wherein the pivoting movement is achieved by utilizing aerodynamic forces acting during flight on the outer wing sections.

5. The aircraft according to claim 1, further comprising:
   a stabilizing mechanism arranged in a region of the pivot axes and configured to lock the outer wing sections in the non-pivoted state against undesired pivoting by aerodynamic forces.

6. The aircraft according claim 1, wherein pivoting is achieved with a pivoting angle of at least 110°.

7. The aircraft of claim 6, wherein pivoting is achieved with a pivoting angle of at least 120°.

8. The aircraft according to claim 1, further comprising:
   a stabilizing mechanism configured to lock free ends of the outer wing sections in a pivoted state.

9. The aircraft according to claim 1, wherein the pivot axes are arranged such that the wingspan of the aircraft is substantially halved by a pivoting movement.

10. The aircraft according to claim 1, wherein in a non-pivoted state, the wings have a positive leading edge sweep or a positive trailing edge sweep.

11. The aircraft of claim 1, wherein the inner wing sections each include an inner aileron and the outer wing sections each include an outer aileron.

12. An aircraft having a variable geometry for adapting the flight characteristics, comprising:
    a fuselage;
    a pair of wings projecting on both sides from the fuselage in transverse direction, wherein each of wings of the pair of wings has an inner wing section arranged stationarily with respect to the fuselage and an outer wing section adjacent to the inner wing section, the outer wing section is configured to be pivotable about a pivot axis, wherein the pivot axis is oriented in a direction deviating from a longitudinal direction of the aircraft by a maximum of 40°, and is substantially oriented in said longitudinal direction;
    a stabilizing mechanism arranged in a region of the pivot axes and configured to lock the outer wing sections in the non-pivoted state against undesired pivoting by aerodynamic forces; and
    aerodynamically effective control elements arranged on the outer wing sections, wherein the aerodynamically effective control elements are control flaps or rudders,
    wherein the aerodynamically effective control elements and the stabilizing mechanism are actuatable in such a manner that the outer wing sections pivot due to aerodynamic forces acting on the outer wing sections, and
    wherein the aerodynamic forces are the exclusive forces acting to pivot the outer wing sections in a direction of the pivot, wherein the outer wing sections are completely aft the inner wing sections.

13. The aircraft according to claim 12, wherein the stabilizing mechanism is actuatable by a control device to deactivate or at least reduce a locking effect.

14. A method comprising: changing a geometry of an aircraft having fixed inner wing sections coupled to hinged outer wing sections during a flight by adjusting control flaps or rudders arranged on the outer wing sections in such a manner that pivoting of the outer wing sections between a pivoted and non-pivoted state is achieved utilizing aerodynamic forces acting on the outer wing sections of the aircraft, and wherein the aerodynamic forces are the exclusive forces acting to pivot the outer wing sections in a direction of the pivot, wherein the outer wing sections are completely aft the inner wing sections.

* * * * *